United States Patent [19]

Kwon et al.

[11] Patent Number: 4,544,211
[45] Date of Patent: Oct. 1, 1985

[54] RECIRCULATING BEARING ASSEMBLY AND METHOD OF MAKING

[75] Inventors: Ki C. Kwon, Charlotte; Thomas A. Luther, Matthews, both of N.C.

[73] Assignee: The Warner & Swasey Company, Cleveland, Ohio

[21] Appl. No.: 556,530

[22] Filed: Nov. 30, 1983

Related U.S. Application Data

[63] Continuation-in-part of Ser. No. 444,292, Nov. 24, 1982, Pat. No. 4,496,195.

[51] Int. Cl.⁴ .............................................. F16C 29/06
[52] U.S. Cl. ..................................................... 308/6 C
[58] Field of Search ............... 308/3 R, 3 A, 6 R, 6 C

[56] References Cited

U.S. PATENT DOCUMENTS

| | | | |
|---|---|---|---|
| 3,003,828 | 10/1961 | Stark | 308/6 C |
| 3,341,262 | 9/1967 | Kalmanek | 308/6 C |
| 3,845,993 | 11/1974 | Schiler | 308/6 C |
| 4,352,526 | 10/1982 | Imai | 308/6 C |
| 4,427,240 | 1/1984 | Teramachi | 308/6 C |
| 4,432,587 | 2/1984 | Bryan | 308/6 C |

FOREIGN PATENT DOCUMENTS 1302026 1/1973 United Kingdom ............... 308/6 C

Primary Examiner—Stuart S. Levy
Assistant Examiner—David Werner
Attorney, Agent, or Firm—Kenneth A. Seaman; Jack R. Benefiel; Raymond J. Eifler

[57] ABSTRACT

The present invention is an improved linear recirculating bearing assembly and method of making it. More particularly, the present invention is a linear roller bearing assembly in which the housing is manufactured of three primary parts, an upper bearing half, a race member and a lower bearing half. The race member includes one or more mounting pedestals having an upper surface finished to a high degree of flatness and parallelism with the lower surface of the race member. The upper bearing half and the lower bearing half include portions to define two recirculating bearing paths for recirculating bearing elements or rollers to recirculate about paths around the race member, with the upper and lower bearing halves being generally non-load bearings, so that they may be manufactured from low cost, low strength materials.

5 Claims, 7 Drawing Figures

RECIRCULATING BEARING ASSEMBLY AND METHOD OF MAKING

CROSS REFERENCE TO RELATED APPLICATIONS

The present patent application is a continuation-in-part patent application of a patent application entitled "Recirculating Bearing Assembly", Ser. No. 444,292, filed Nov. 24, 1982 by Ki Choong Kwon and Thomas Andrew Luther now U.S. Pat. No. 4,496,195. This patent is sometimes referred to as the "Bearing Patent I" and is expressly incorporated herein by reference.

BACKGROUND OF THE INVENTION

1. Technical Field

The present invention relates to improvements in a recirculating bearing assembly and improved methods of making such a bearing assembly. In particular, the present invention is directed to a linear recirculating bearing assembly having high quality and performance characteristics, but low manufacturing costs.

2. Background Art

Several types of recirculating bearings are known in the prior art as described in the Bearing patent I.

In many bearing assemblies of the prior art, such bearings typically have multiple machined pieces or components which must be accurately manufactured and precisely fit together to achieve design standards. Frequently, the designs call for different surfaces on different components to be parallel and/or flat to a very precise level.

Further, the prior art bearing systems typically include a substantial number of high precision discrete components, each of which must be manufactured, inspected, inventoried and assembled separately.

As a further limitation of prior art systems, frequently all components must be made of a high precision, expensive-to-form material which is heavy, such as bearing steel. While such systems provide high quality and generally long life and resist environment and other degrading forces, the cost of manufacturing such systems is higher than necessary. Such materials add cost and weight to the component, which is not desirable.

Many examples of linear recirculating bearings are known in the prior art, these generally have one or more of the foregoing limitations or disadvantages, either bearing cost, or weight or poor performance or difficulty of manufacture, which makes them undesirable.

Accordingly, the prior art bearing assemblies have limitations, generally described in terms of performance and or manufacturing cost. Advantageously, manufacturing of bearing components and their assembly would be simplified.

DISCLOSURE OF THE INVENTION

The present invention is a recirculating bearing assembly which overcomes the limitations and disadvantages of the prior art bearing assemblies while providing improved performance including low mass, fewer components, fewer precision components, resistance to skewing and low friction movement.

The present invention is a linear recirculating bearing assembly in which roller bearing elements are retained within a retaining frame including three principle elements, an upper retaining element, a medial track element having one or more projecting legs which are secured to the moving member and a lower retaining element, with the upper and lower elements fitting together around a track element to encapsulate roller bearing elements.

An advantageous effect of the present invention is that the track member includes substantially all surfaces of bearing mounting and load carrying contact with the roller elements. The track member also has all the important final ground surfaces which must be finished to a high degree of flatness and parallelism.

As a further advantage, the bearing design of the present invention includes two members, the upper retaining part and the lower retaining part, which may be molded to a desired shape from a plastic material if desired. The upper and lower retaining part are not high-load-bearing parts, but merely guides for the recirculating roller elements.

As a further advantageous effect of the facts stated in the preceding paragraph, the upper and lower retaining elements may be formed with integral side retaining structures and end caps so that separate retainers are not required in the present invention, reducing the number of discrete parts required.

The present invention has the added advantage that the upper and lower retaining elements in some embodiments need not be heat treated or hardened, eliminating one or more steps in the manufacturing process and associated costs and the duration of the manufacturing process.

Other objects and advantages of the present invention and limitations of the prior art bearing assemblies which are overcome by the present invention will be apparent to one skilled in the art of manufacturing recirculating linear bearings in view of the following detailed description of the present invention, taken in conjunction with the accompanying drawings and the appended claims.

BEST MODE FOR CARRYING OUT THE INVENTION

Figure 1:
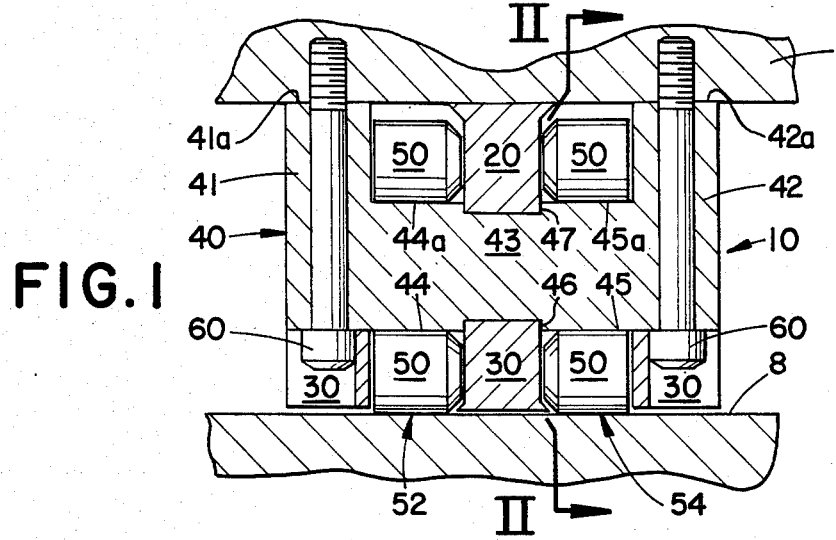
FIG. 1 is a cross sectional front view of a roller bearing assembly of the present invention, as seen from the line I—I in FIG. 2, looking in the direction of the arrows.

FIG. 1 is a cross sectional front view of a roller bearing assembly 10 of the present invention. The bearing assembly 10 is mounted to a movable member 6 and rides on a fixed member or way surface 8. The bearing assembly 10 in the present invention allows the movable member 6 to traverse in a linear direction into and out of the paper along the way surface 8 which extends in that direction.

The bearing assembly 10 includes an upper housing half 20, a lower housing half 30 and a track member 40. The track member 40 is located medially between the upper housing half 20 and the lower housing half 30 and is in contact with both. A plurality of roller bearing elements 50 are shown in this figure. The roller elements 50 include a left track including a plurality of recirculating roller elements 52 and a right track including a plurality of recirculating roller elements 54. Screws 60 secure the bearing assembly 10 to the movable member 6.

The race member 40 includes integral mounting pedestals 41, 42 which extend upwardly from a body portion 43 of the race member 40. The body portion 43 includes load bearing surfaces 44, 45 and return path 44a, 45a and grooves 46, 47. The upper housing half 20 fits into the groove 47 and the lower housing half 30 fits into the groove 46. The load bearing surfaces 44, 45 are ground flat and parallel to upper surfaces 41a, 42a of the mounting pedestals 41, 42.

Figure 2:
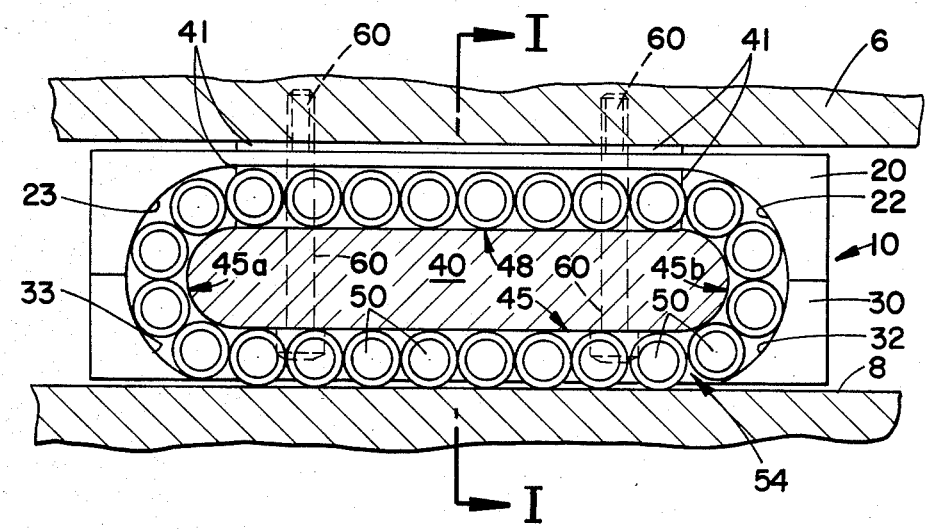
FIG. 2 is a cross sectional side view of the roller bearing assembly of FIG. 1, taken from the line II—II in FIG. 1, looking in the direction of the arrows.

FIG. 2 is a cross sectional side view of the bearing assembly 10 of the present invention, as seen from the line II—II in FIG. 1 looking in the direction of the arrows. The right recirculating track of roller elements 54 is shown in this view to include a plurality of rollers mounted around the race member 40 which includes generally parallel surfaces referred to an upper surface 48 and a lower surface 45, with half rounded ends 45a, 45b. The half rounded ends 45a, 45b and the upper surface 48 define the internal portion of a recirculating path for the roller bearing elements 50 moving to traverse therearound during the unloaded portion of their path. The loaded or load bearing portion occurs while the bearing elements are captivated by and in contact with both the lower surface 45 and the way surface 8.

As shown in FIG. 2, the movable member 6 is positioned above the bearing assembly 10 with recirculating bearing elements 50 riding on the fixed member or way surface 8.

The upper housing half 20 sits immediately above the lower housing half 30. Rounded internal surfaces 22, 23 of the upper housing half 20 cooperate with adjacent rounded internal surfaces 32, 33 of the lower housing half 30 to define the outside edge of the recirculating roller path for unloaded bearings to recirculate.

The race member 40 and portions of one integral mounting pedestal 41 are shown in this view. The pedestal 41 extends behind the rollers rolling on the upper surface 48 of the race member 40. Screws 60 secure the race member to the movable member 6.

Figure 3:
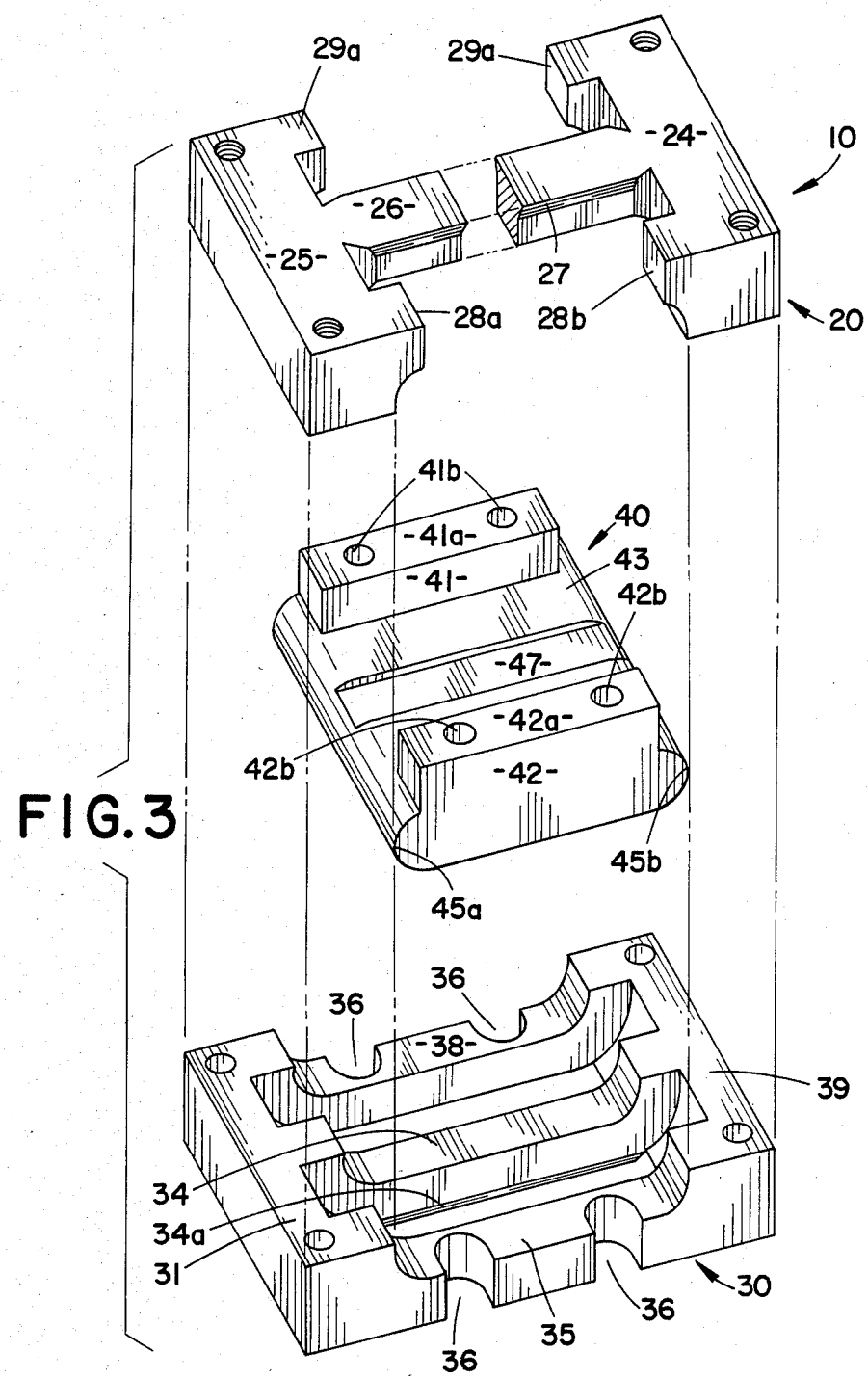
FIG. 3 is an exploded perspective view of the primary structural elements of the bearing assembly of FIGS. 1 and 2.

FIG. 3 is an exploded perspective view of the principal structural elements of the bearing assembly 10. The upper housing half 20 is shown above the race member 40 and the lower housing half 30 is shown below it. Dotted projecting lines show interfitting of selected portions of the bearing assembly 10.

The upper housing half 20 includes integral end sections 24, 25 connected by a medial spline 26. The medial spline 26 has an outwardly flaring flange 27 which serves to encapsulate the bearing elements so when assembled.

The near side of the upper housing half 20 includes projections 28a, 28b, the upper portions of which fit around the mounting pedestal 42 and the lower portions of which are rounded to receive the rounded ends 45a, 45b of the race member 40. Similarly, the far side includes projections 29a, 29b shaped for receiving the other mounting pedestal 41.

The race member 40 is shown with the upper surfaces 41a, 42a of the mounting pedestals 41, 42 shown with round holes 41b, 42b for receiving mounting screws (not shown). The groove 47 is shown in the upper surface of the race member body 43, with the lower groove hidden from view. When assembled, the lower portion of the medial spline 26 of the upper housing half 20 fits into the groove 47, and one recirculating track for the bearing elements is defined on the top surface of race member 40 between the spline 26 and the mounting pedestal 41, the other between the spline 26 and the other pedestal 42. The lower housing half 30 is shown with end portions 31, 39 connected by splines 34, 35, 38. One race of recirculating roller elements is defined between each adjacent pair of splines, that is, between the splines 38, 34 and between the splines 34, 35. The spline 34 advantageously fits into the corresponding shaped groove 46 in the lower surface of the race member 40. The spline 34 includes an outwardly flaring flange 34a at its lower portion (on each side, only one shown) to encapsulate the bearing elements (both sets of roller elements) when assembled. The outside splines 38, 35 include an upper surface configuration shaped to receive the lower portion of the race body 43 therein. Cutouts 36 are provided to access screws (not shown) securing the race member 40 to the movable member (6 in FIG. 1 and 2, not shown in FIG. 3).

Figure 4:
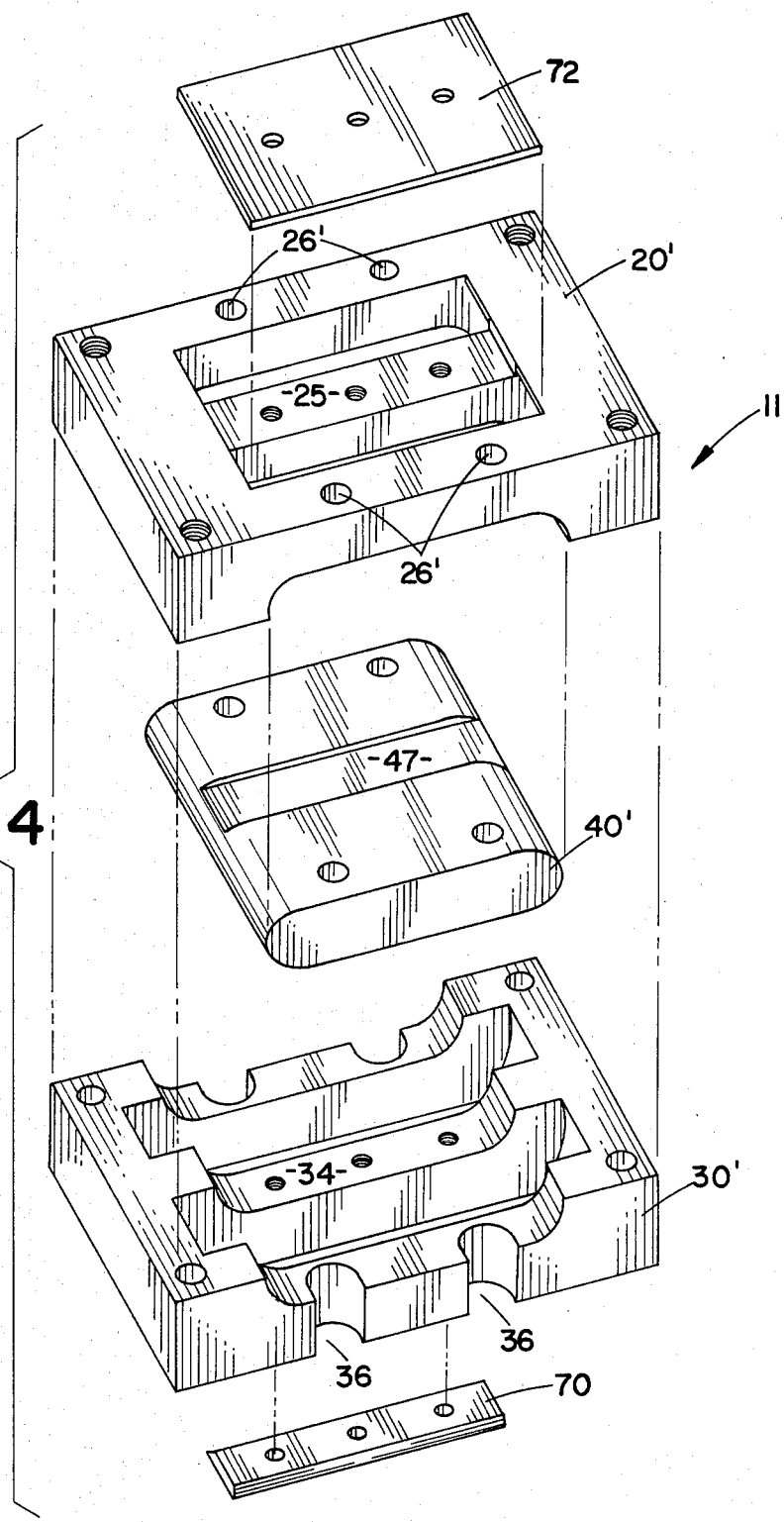
FIG. 4 is an exploded perspective view of the major structural elements of a bearing assembly which is an alternate embodiment to that shown in FIG. 3.

FIG. 4 is a perspective, exploded view of a bearing assembly 11 which is an alternate embodiment to the bearing assembly 10 shown in FIGS. 1-3 and described in connection therewith. The structure of the lower housing half 30' is similar to the lower housing half 30 except the medial spline 34' has a uniform width from top to bottom, i.e., omitting the outwardly flaring flange present in the embodiment of FIGS. 1-3. A separately made lower plate 70 accomplishes the bearing element encapsulation or retention function while removably allowing access to the bearing elements. An upper plate 72 (which also may be removable) retains the bearing elements encapsulated at the top of the bearing, which is desirable to retain the bearing roller elements. A medial spline 25' may have a uniform cross section from top to bottom, instead of the flaring flange of FIGS. 1-3.

An upper housing half 20' is similar in shape to the lower housing half 30', differing only in the substitution of mounting screw holes 26' in place of the cutouts 36 on the lower housing half. Advantageously, both housing halves 20', 30' could be manufactured from a single design, with the upper half 20' having screw holes 26' and the lower housing half 30' having cutouts 36.

The race member 40' is formed as a flat member without the integral mounting pedestals. The groove 47 receives the medial spline 25 of the upper housing half 20, and a lower groove (not shown) receives the medial spline 34' of the lower housing half 30'.

Figure 5:
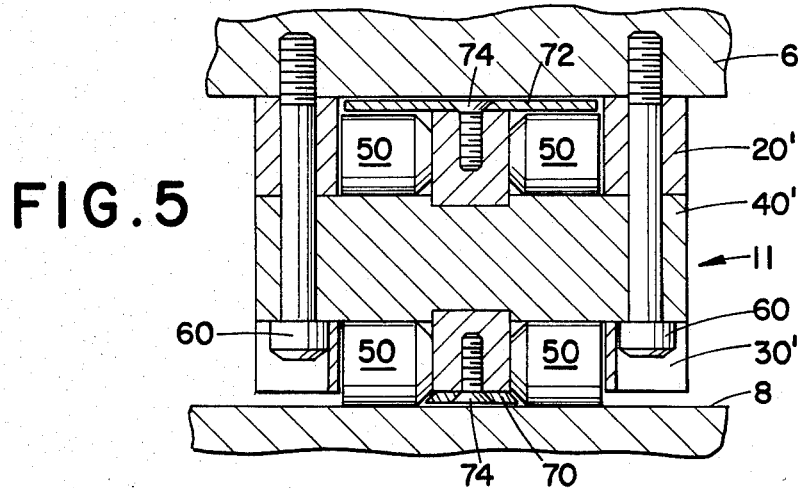
FIG. 5 is a cross sectional front view of the bearing assembly of FIG. 4 after assembly and mounting.

FIG. 5 is a cross sectional view of the bearing assembly 11 of FIG. 4, assembled between the movable member 6 and the way surface 8. The upper housing half 20', the lower housing half 30' are assembled around the race member 40', with the plates 70, 72 securing the roller elements 50 within the bearing assembly 11. Screws 74 secure the plates 70, 72 and screws 60 secure the bearing assembly 11 to the movable member 6.

Figure 7:
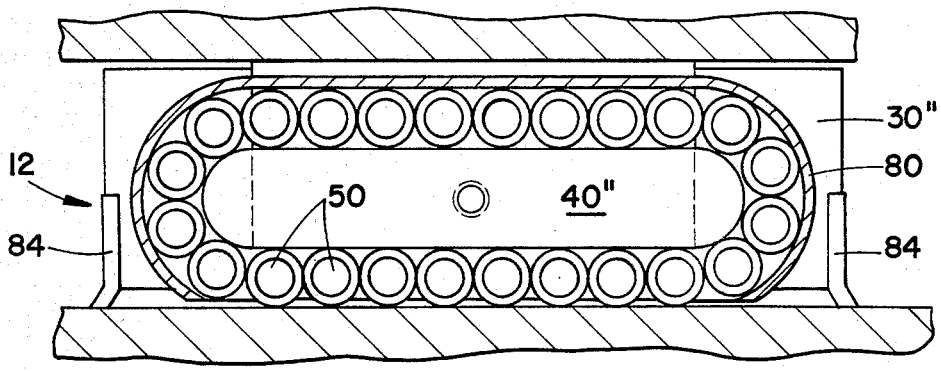
FIG. 7 is a cross sectional side view of the bearing assembly of FIG. 6, similar to that displayed in FIG. 2.
Figure 6:
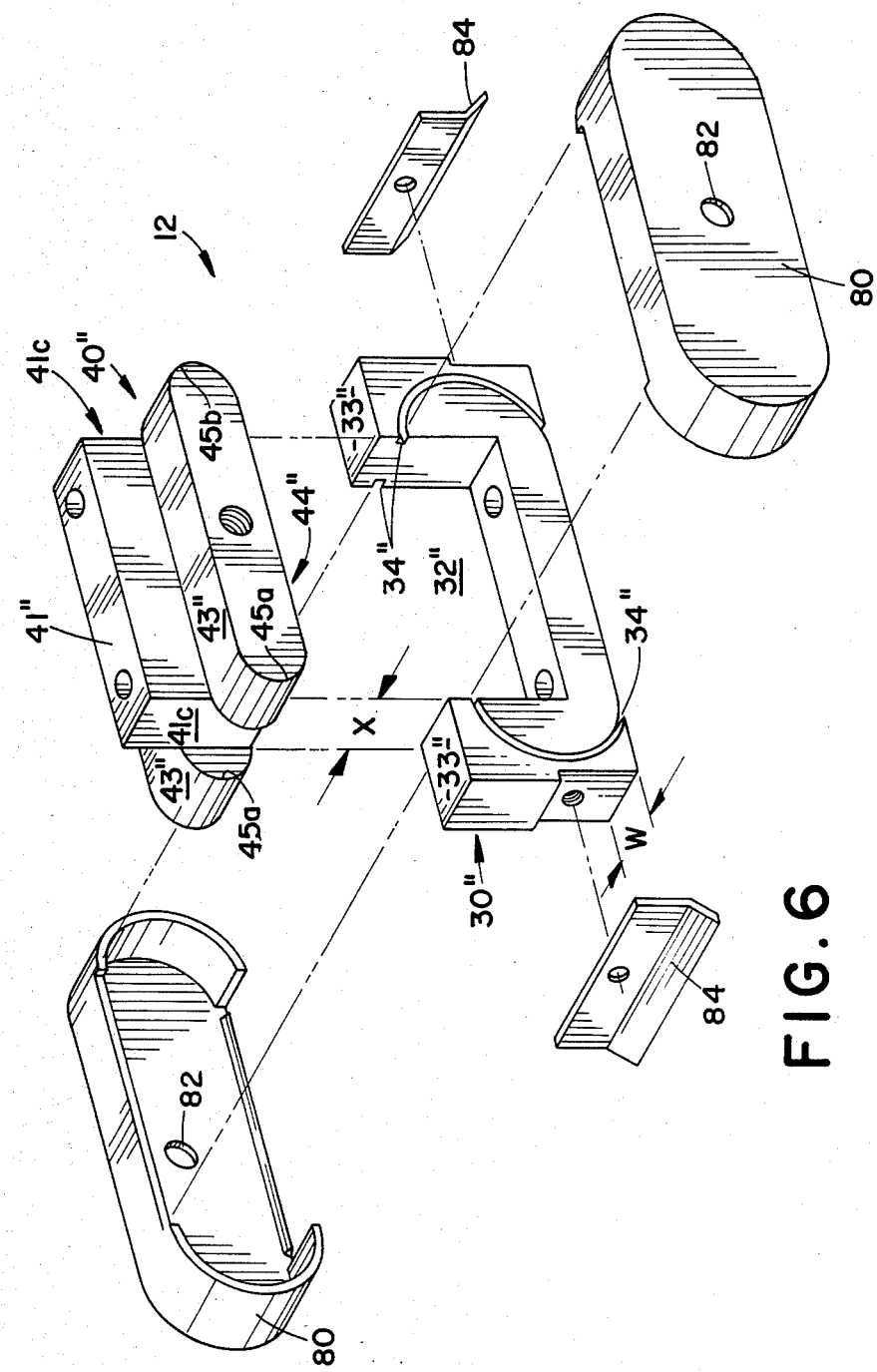
FIG. 6 is an exploded perspective view of another alternate embodiment of major structural elements of a bearings assembly.

FIGS. 6 and 7 depict an alternate embodiment of a bearing assembly 12 of the present invention. FIG. 6 is an exploded view of the assembly 12 in which a race member 40″ is formed with a central mounting pedestal 41″ integral therewith. Rounded ends 45a, 45b on races 43″ extend beyond squared edges 41c of the race member 40″. The race member 40″ fits into a housing 30″ which has an aperture 32″ complementary to the shape of the mounting pedestal 41″. The housing 30″ has a thickness W which is substantially the same (slightly smaller) than the distance X between the rounded ends 45a, 45b of the two tracks on the race member 40″ so that the two rounded ends 45a fit around the upwardly projecting portions 33″ of the housing 30″. Bearing retaining covers 80, formed or stamped of sheet metal or molded plastic or metal casting, define the outer path of the recirculating bearing elements and are assembled into recesses 34″ formed on either side of the housing 30″ and secured with screws or a through bolt (not shown) in hole 82.

The race member 40″ defines the inside of the path of the recirculating roller elements along races 43″, 44″ and the rounded ends 45a, 45b. The lower race surface 44″ is ground to a high degree of flatness and parallelism with respect to the upper surface of the mounting pedestal 41″.

Optional way wipers 84 are shown in this figure, mounted on the front and rear of the bearing assembly 12.

FIG. 7 is a cross sectional side view of the bearing assembly 12 of FIG. 6, after assembly. The housing 30″, the race member 40″, one of the side covers 80 and the wipers 84 are shown, with roller bearing elements 50.

Of course, many modifications of and substitutions within the present invention are possible without departing from the spirit thereof. The present invention has been described in terms of generally cylindrical rollers having a tapered end, but such rollers are neither necessary nor unique, other types of rollers being well applied in the art. The methods of locating and securing the pieces of the bearing assembly together have been described in their preferred embodiment, but the details such as the locating grooves are desirable and advantageous but not required for the present invention. Accordingly, the foregoing description of the preferred embodiment of the present invention should be considered as merely illustrative of the principals thereof and not in limitation thereof. The following claims are intended as the sole description of the limits of the present invention.

Having thus described the invention, what is claimed is:

1. A recirculating element bearing adapted to be disposed between relatively linearly movable support members to provide antifriction support therebetween, said bearing comprising:
   an elongated unitary track member formed with a pair of parallel, side-by-side and spaced apart track surfaces each defined by upper and lower surfaces extending along the length of said track member and by half-round surfaces at either end thereof extending between the upper and lower surfaces, thereby providing an endless recirculation path;
   housing means extending around each of said track surfaces to enclose said track surfaces with a space between each track surface and said housing means;
   a plurality of elongated rollers disposed within each of said spaces and oriented to roll along said track surfaces, said housing means exposing said rollers above one of said track surfaces to enable contact with one of said support members;
   said track member provided with at least one lengthwise extending medial feature discontinuous with said track surfaces;
   said at least one medial feature comprising a lengthwise extending recess formed into said upper surface of said track member; and,
   said housing means including a pair of housing members mounted to said track member and to each other, one of said housing members including a lengthwise extending linearly formed portion interfit into said recess to be located thereby.

2. The recirculating element bearing according to claim 1 wherein said linearly formed portion is further formed with flaring portions in the outer part thereof acting to confine said rollers.

3. The recirculating element bearing according to claim 1 wherein said unitary track member is formed with a pair of projecting rib portions extending upwardly from said upper surface and alongside thereof, interfitting into respective openings in said one housing member.

4. A recirculating element bearing adapted to be disposed between relatively linearly movable support members to provide antifriction support therebetween, said bearing comprising:
   an elongated unitary track member formed with a pair of parallel, side-by-side and spaced apart track surfaces each defined by upper and lower surfaces extending along the length of said track member and by half-round surfaces at either end thereof extending between the upper and lower surfaces, thereby providing an endless recirculation path;
   housing means extending around each of said track surfaces to enclose said track surfaces with a space between each track surface and said housing means;
   a plurality of elongated rollers disposed within each of said spaces and oriented to roll along said track surfaces, said housing means exposing said rollers above one of said track surfaces to enable contact with one of said support members;
   said track member provided with at least one lengthwise extending medial feature discontinuous with said track surfaces;
   said medial feature comprising a centrally located upwardly projecting lengthwise rib portion and end recesses located inward from each of said half-rounded surfaces and said housing means including a central housing member interfit between said end recesses, and a pair of side housing members mounted to said central housing member each having a lengthwise surface fit against one side of said rib.

5. The recirculating element bearing according to claim 4 wherein said lengthwise central rib projects beyond said housing means, said rib formed with through openings adapted to receive mounting screws for mounting said track member to one of said supported members.

* * * * *